United States Patent Office 3,332,535
Patented July 25, 1967

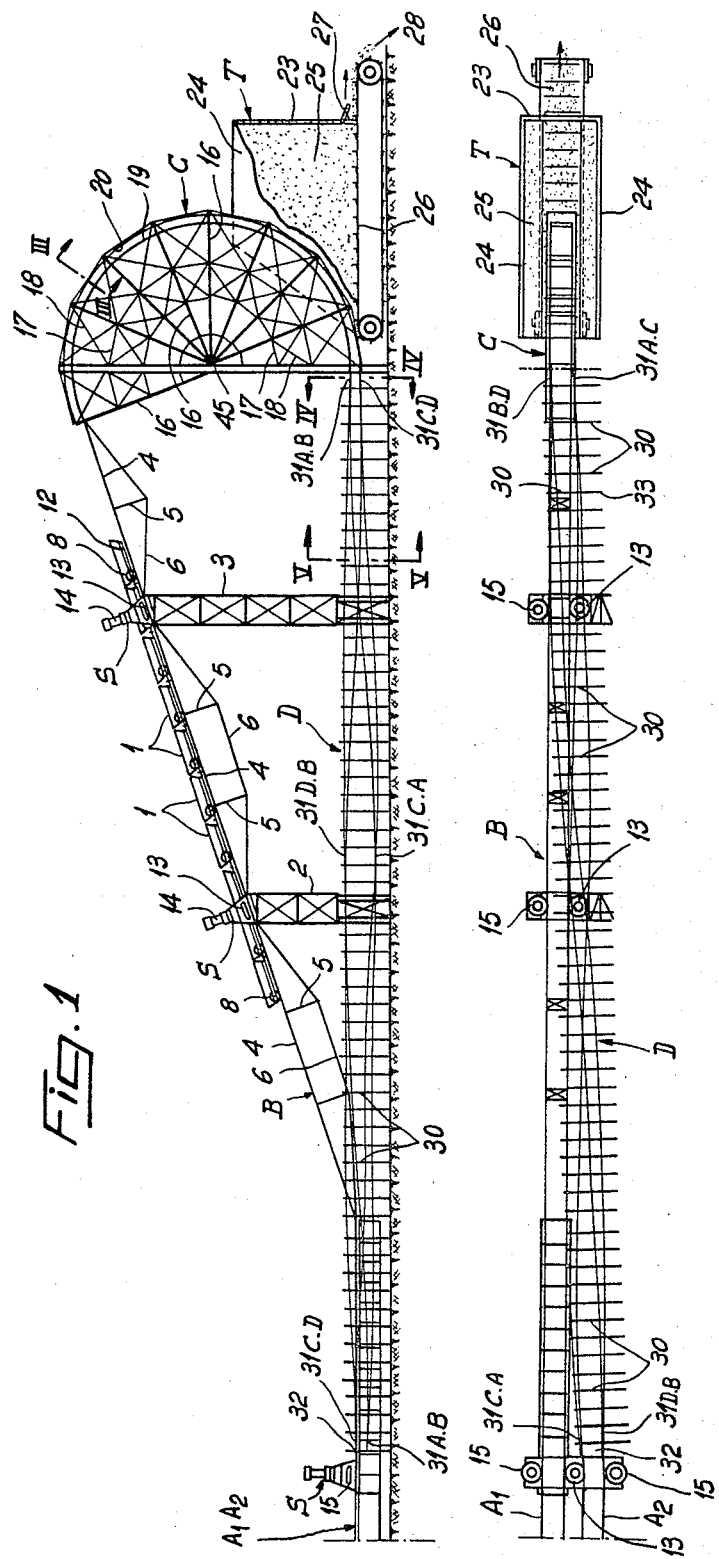

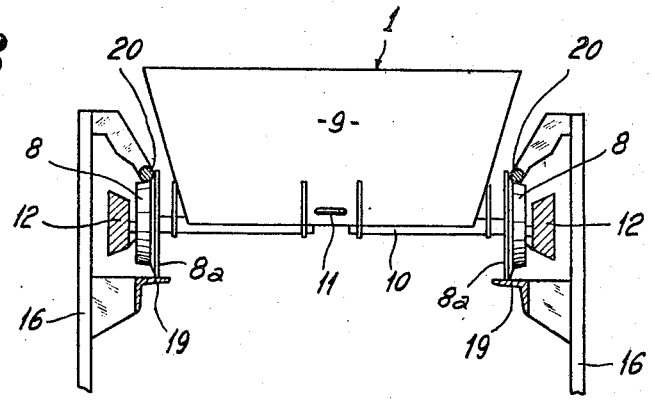
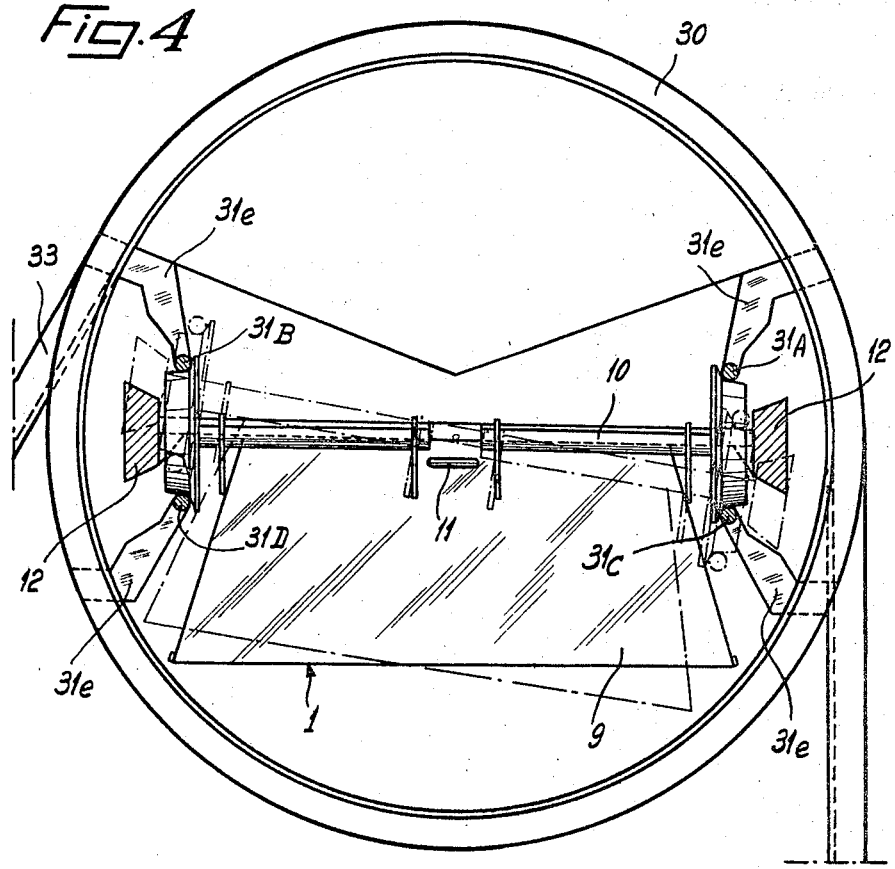

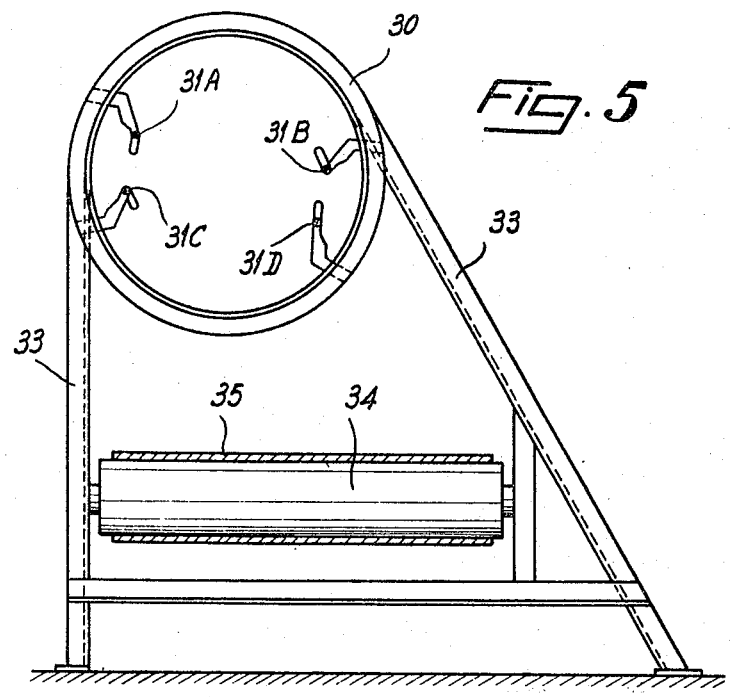
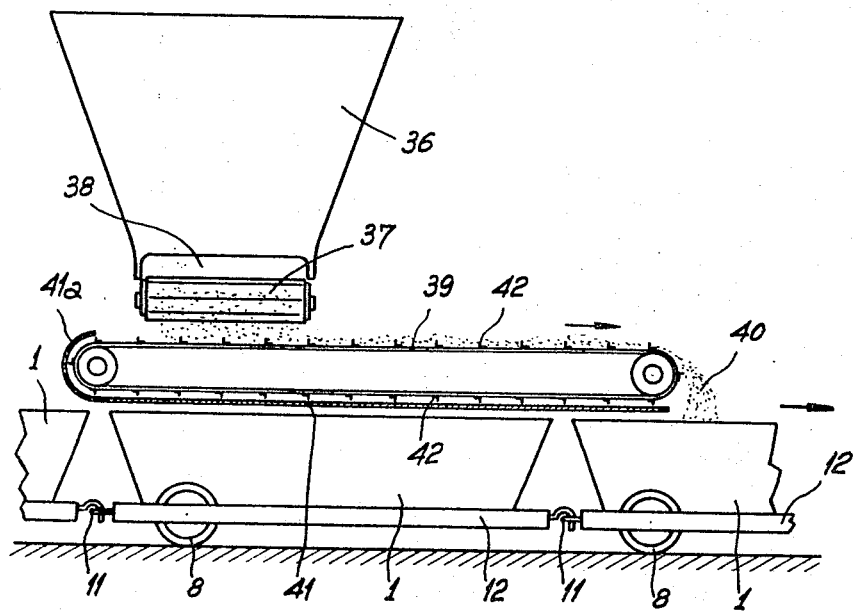

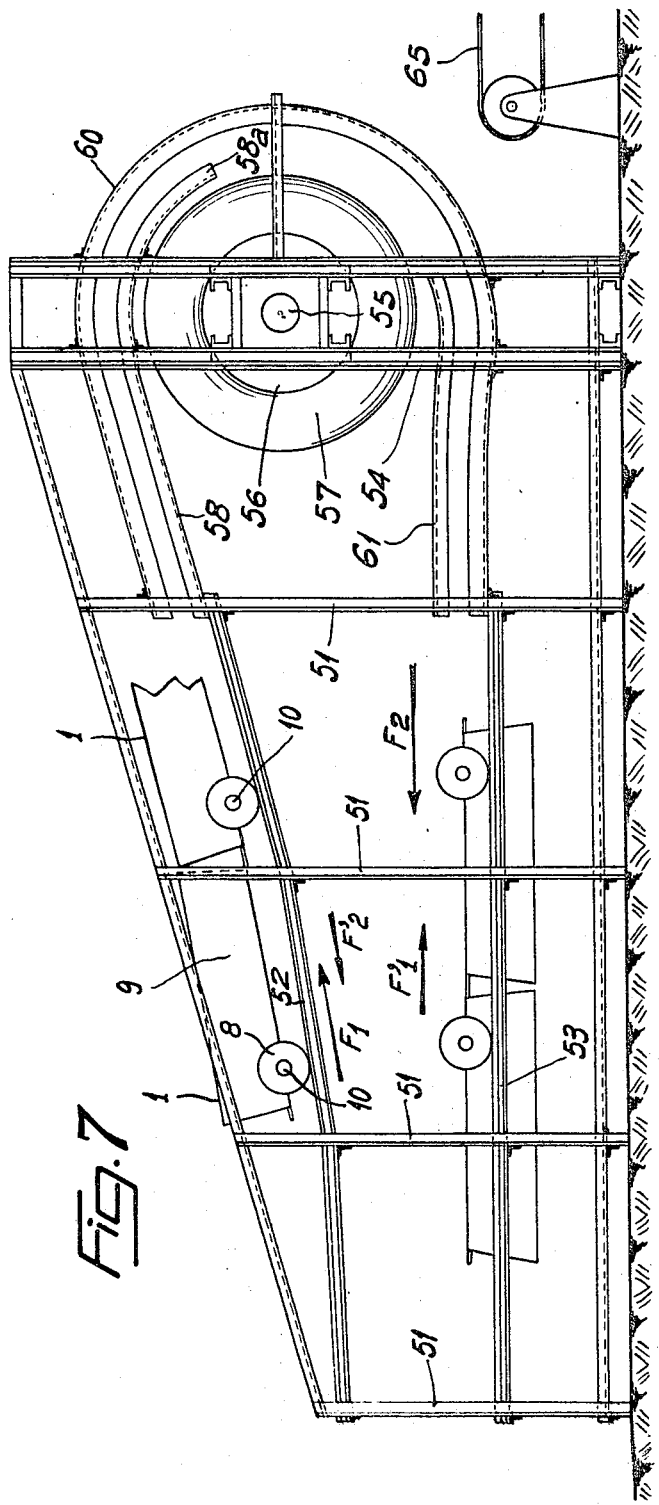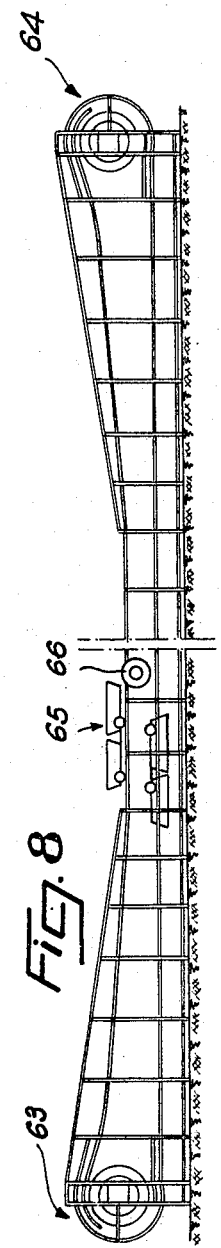

3,332,535
ROLLING CONVEYOR SYSTEMS
Jean M. A. Hubert, Paris, France,, assignor to Societe d'Etudes et d'Exploitation pour le Transport Continu par Canalisation Mobile, Paris, France, a corporation of France
Filed Aug. 11, 1965, Ser. No. 478,968
Claims priority, application France, Aug. 21, 1964, 985,889
11 Claims. (Cl. 198—141)

ABSTRACT OF THE DISCLOSURE

A conveyor system for bulk material wherein a chain of open-top cars are connected end to end by respective swivels permitting relative angular movement between the cars and are supported by a continuous track having upper and lower track portions lying in a common vertical plane. At a return station of the track, a semicircular track section in this vertical plane interconnects the upper and lower track portions. To permit self-alignment of the cars, which are supported only by single-wear axles at locations remote from the forward swivels, a pneumatically cushioned pulley guides the cars around this arcuate track section. The cars are restored to their upright conditions by passing over a helicoidal track section whose rails are of circular cross-section.

---

This invention relates to rolling conveyors or carrier systems of the type comprising longitudinally flexible strings of carriers mounted on longitudinally spaced wheels running on tracks. In such a system, each string or chains of carriers is usually driven from one of more power-drive stations positioned along the tracks, and including a motor-driven wheel frictionally engaging a longitudinal side surface of the string of carriers.

In systems of this kind, the longitudinally flexible string of carriers may comprise a train of wheeled trucks hingedly interconnected so as to permit substantial angling between adjacent trucks, and having open-topped bins. Alternatively, the said string of carrier means may constitute one or more elongated conduits made of a material having substantial longitudinal flexibility and mounted on longitudinally spaced sets of wheels, said conduits having open or sealable tops.

Usually a plurality of carrier strings, more or less spaced apart, occupies the length of the track.

It is a primary object of this invention to provide an improved form of terminal station for rolling conveyor or carrier systems of this type, wherein the loaded carrier means, e.g. trucks, will be reversed as to their direction of travel and simultaneously overturned, so as to unload their contents, before being returned empty in the direction whence they came.

Heretofore, the reversal in direction of such a string of carriers or trucks has usually been obtained by providing a loop in the tracks of the system in a horizontal plane. Unloading where necessary has been performed by tipping the trucks. Sometimes the direction-reversal was obtained by means of two consecutive cusps formed in the tracks. Such means of direction-reversal consume considerable ground space, which is frequently objectionable and sometimes unacceptable. Tipping of the trucks requires relatively complicated mechanism, and the unloading operations are sometimes only partly effective since much of the contents of the trucks may cling to the walls thereof.

Objects of this invention include the provision of a combined direction-reversing and unloading station which will take up substantially no more ground space than the width of the track itself, and which will concurrently and at no extra cost perform an extremely effective unloading operation.

Basically these objects of the invention are accomplished by providing means whereby the string of carriers will describe, at a terminal station, a loop in a vertical plane. Thus, the string of trucks may approach the terminal station over an upper track, the trucks being in upright condition and loaded. At the terminal station, the loaded trucks are caused to follow a descending semi-circular path in a vertical plane whereby they are simultaneously overturned or capsized, and reversed as to their direction of travel, so as to proceed back over a lower track in the same general direction from whence they came, now being in an overturned condition. In the process, of course, the trucks have been thoroughly unloaded of their contents. Suitable receiving means may be positioned so as to receive the contents dumped out of the trucks as they follow their descending semi-circular path in the vertical plane.

According to an advantageous feature of the invention, means are provided for restoring the carriers to their normal upright condition as they return back from the terminal reversing and unloading station.

Objects of this invention further include provisions for constructing a reversing-and-dumping terminal station of this character, which will be of minimum height, size and weight. A related object is to provide such a terminal station which may, where desired, be made mobile so as to be readily shifted from one place to another as the progress of the work may dictate, as in earth-moving and/or mining operations. An object is to provide means whereby the radius of the semi-circular vertical overturning and reversing track section can be made extremely short, thus minimizing the elevation of the system, without impairing the operation thereof. Another object is to provide a continuous loading station for rolling conveyor or carrier systems of this general class.

Exemplary embodiments of the invention are described for purposes of illustration with reference to the accompanying drawing, wherein:

FIG. 1 is a general elevational view of a terminal reversing-and-unloading station according to this invention;

FIG. 2 is a corresponding view in plan;

FIG. 3 is a cross sectional view on line III—III of FIG. 1, drawn to an enlarged scale;

FIG. 4 is a cross sectional view on line IV—IV of FIG. 1, on a further enlarged scale;

FIG. 5 is a large-scale, and somewhat simplified cross sectional view on line V—V of FIG. 1;

FIG. 6 is a simplified elevational view of a continuous loading station usable according to an aspect of the invention;

FIG. 7 is an elevational view of a modified terminal reversing and dumping station according to the invention; and FIG. 8 is a smaller-scale view of a conveyor or carrier system having two terminal stations similar to the one shown at FIG. 7 at opposite terminal ends thereof.

Referring first to FIGS. 1 and 2, there is shown at the left side of the drawing the end sections of a pair of straight, flat, parallel, tracks A1 and A2 which together constitute part of a two-way line for strings or chains of intercoupled carrier trucks or cars in an otherwise conventional rolling conveyor system. The invention is more particularly concerned with a combined tipping-and-reversing station whereby the string of loaded cars moving in to the system toward the right, say over the track A1, can be continuously unloaded and reversed in direction so as to depart toward the left over the track A2 in empty condition.

Connected to the flat track section A1 is an upwardly inclined ramp track section B supported by spaced towers 2 and 3. As here shown the ramp section B includes three spans of truss girders 4 of conventional construction including web members 5 and chord members 6. FIG. 1 further shows a partial string of cars 1 provided with wheels or rollers 8 in the act of ascending the inclined-ramp track B. A typical construction for the cars 1 will be described in greater detail later with reference to FIG. 3.

In the generally conventional type of rolling conveyor or carrier system to which the invention relates, the trains of cars or trucks 1 are usually not self-powered, but instead are preferably propelled by a plurality of drive stations S (FIG. 1) spaced along the length of the system, adjacent the track. Each drive station S may include an electric motor 14 and a drive wheel 13 rotated thereby in a plane parallel to that of the track and drivingly engaging a side surface of each truck 1 as will presently appear.

In the typical truck construction illustrated in FIGS. 3 and 4, each truck or car 1 comprises an open bin or container 9 of trapezoidal shape having a single axle 10 secured across its bottom wall near an end of the truck (FIG. 6). The axle 10 rotatably carries a pair of flanged wheels 8 at its ends, each wheel having a frustoconical rim and an inboard radial annular flange 8a. As shown in FIG. 6, each truck 1 is supported at its forward end by the rear end of the truck in front of it, via a simple pivotal coupling or hinge device 11 including interengaging hook and eye members which provide for the necessary support while permitting a considerable degree of relative angular movement between adjacent trucks in all transverse directions.

Fixedly supported from the bin 9 of each truck through suitable means not shown are longitudinal side members or outriggers 12 which extend alongside the trucks or cars 1 outboard from the wheels 8, the outer surfaces of the side members 12 being adapted for frictional engagement with the afore-mentioned drive wheels 13 at the fixed power stations S. Advantageously, the drive wheels 13 are fitted with air-inflated rubber tires which engage the members 12. Each power station S may include a drive wheel 13 driven from the motor 14 and engaging one of the side members 12 of all the trucks, and an idle backing wheel 15 positioned to be simultaneously engageable with the opposite side members 12.

It will be apparent that with the generally conventional arrangement just described the string of loaded cars 1 can be efficiently propelled along their path provided the drive stations S are suitably spaced in relation to the unit power rating of the motors 14, the loading of the cars per unit length of track, and the gradient of the track. While the drawing indicates a drive station S provided on each of the towers 2 and 3 supporting the inclined track section B, this may not be necessary in certain cases, as when the gradient of said track section is relatively low.

Connecting in a generally tangential manner with the upper end of the inclined track station B is a semi-circular track section C, positioned in a vertical plane (FIGS. 1 and 2). This track section C is supoprted by a truss structure which essentially comprises radial members 16 extending outwards from a central panel point 45 and interconnected by the circumferentially extending chord members 17 and diagonal members 18.

The part-circular track section C comprises a pair of concentric tracks 19 and 20 at each side of the chain of trucks. The inner track 19 is continuous with the inclined track section B merging tangentially therewith at the junction between the upper end of inclined section B and circular section C. The outer track 20 is, as just stated, concentric with the inner track 19 and is spaced radially outward therefrom a distance corresponding to the effective diameter of the wheels 8, its lower end merging continuously with the lower track D as will presently appear. It will be understood that as each truck 1 moves downward along the curved path defined by the part-circular track section C, its wheels 8 are first supported on the inner track 19 in an initial stage of its descent. At a certain point on the downgoing circular path, at or about the time the wheels move past the vertical portion of this path and enter the reversely curved portion thereof, the wheels disengage the inner track 19 and their load is transferred to the outer track 20. At this point of load transfer, there occurs a sudden reversal in the direction of rotation of the wheels. It will be noted that in FIG. 1 both concentric tracks 19 and 20 are shown as extending the full circumferential length of the part-circular track section C. The outer track 20 in its upper part serves as a backing or check rail track for the truck wheels in the initial part of the circular path while said wheels are still being supported by the inner track 19, whereas said inner track 19 serves as a backing or check-rail track in the latter part of said circular path while the wheels are being supported by the outer track 20. If desired, the extent of overlap between the concentric track sections 19 and 20 may be made less than the full arcuate extent of the part-circular track section C. In particular, the inner part-circular track 19 may be considerably foreshortened or in part omitted, in view of the centrifugal force acting on the trucks especially in cases where the linear velocity of the conveyor system is relatively high.

The inner track section 19 as shown in FIG. 3 is composed of a pair of rails in the form of simple angles having one flange supported through suitable brackets from radial truss members 16 of the part-circular supporting structure, and their other flange engaging the outer peripheral surface of the wheel flanges 8a. This arrangement, or any equivalent arrangement wherein the rails of the inner track 19 include generally flat surfaces engageable with the peripheries of the wheel flanges 8a, is preferred according to the invention in view of the afore-mentioned sudden reversal of wheel rotation that occurs at the time of load transfer from the inner to the outer one of the concentric tracks. Flat peripheral engagement of the rails with wear-taking surfaces of the wheel flanges makes it possible to minimize the resulting wear and prolong the life of the wheels.

The outer track section 20 as shown in FIG. 3 is composed of a pair of rails in the form of circular-section bars supported through suitable brackets from the outer ends of the radial truss web members 16, in positions to engage the frustoconical rims of the wheels 8 and the sides of the wheel flanges 8a as shown, thereby serving simultaneously to support the wheel load and to guide the wheels laterally. While the rail configurations here shown for the inner and outer tracks 19 and 20 are effective and economical, it will be understood that other rail shapes may be used, e.g. conventional rail profiles.

The trucks 1 as they move down and around the part-circular track section C in the manner described above are, as will be obvious, subjected to a reversal in their direction and simultaneously overturned or capsized, so that on reaching the bottom of the part-circular track section C the trucks 1 are returned toward the left (FIGS. 1 and 2) i.e. back towards where they came from, and are in an inverted condition, with the open tops of their container bins 9 directed downward. Thus, during the combined reversing and overturning movement which the trucks undergo as they move over the part-circular track section C, the trucks are caused to dump the contents of the bins 9. According to a preferred feature of the invention, a receiving station generally designated T is arranged beneath the forward end of the part-circular path section C to receive the dumped truckloads. Receiver station T is shown as including a storage enclosure having a front vertical wall 23 and side walls 24. The bottom of the enclosure is formed at least in part by the upper reach of an endles conveyor belt 26, e.g. of the flight-conveyor type having a pair of parallel endless chains and cross-members interconnecting the chains and fitted with scraper elements. The conveyor 26 is thus adapted continuously to undercut material from the base of the heap of material 25 dumped into the enclosure T from the turcks 1 and discharge the withdrawn material by way of a lower outlet opening 27 formed in the front enclosure wall 23, so as to deliver the material continuously to a collecting station represented at 28.

As noted above the trucks 1 on reaching the bottom stretch of the part-circular vertical track section C are in overturned or inverted condition. In the embodiment of the invention being described, means are provided for reorienting the trucks to an upright condition before they reach the outgoing straight track section A2 at the left of the illustrated structure. The restoring means comprises a track section D which is twisted around its longitudinal center axis in the general form of a helicoid.

Specifically, referring to FIG. 4, restoring track section D comprises a set of four rails 31A, 31B, 31C, 31D, supported by way of welded brackets 31e from the interior of circular frames 30. The circular frames 30 may be uniformly spaced along the length of the track section D in a straight-line array, they may be all similar and incrementally displaced equal angular amounts as from each frame to the next. Each circular frame 30 is carried at the top of a trapezoidal supporting structure including the legs 33. The four rails 31A through 31D, desirably round bar stock as shown, are so positioned that in any common transverse plane, such as the transverse plane of a circular frame 30 as shown in FIG. 4 the centers of said four rails lie on the vertices of a common rectangle with the rails 31A and 31C being engageable with opposite sides of one of the truck wheels 8 and rails 31B and 31D engageable with the other truck wheel. Moreover, each of the four rails 31A through D is longitudinally shaped into one-half a convolution of a helix, and it will readily be understood that the resulting track arrangement will cause each successive truck 1 as it is passed over the helicoidal track section D to be rotated about its longitudinal axis by 180°, thereby restoring the truck from the overturned condition assumed by the trucks at the bottom outlet from the circular track section C, to its normal upright condition at the outlet extremity 32 of the track section D, where section D connects with the straight return track section A2.

During this movement the point of engagement of a truck wheel 8 with each one of the four rails 31A–31D also describes a helical trajectory around the rail. By making the four helical rails from round bar stock as shown, this helicoidal motion of each truck wheel around each helical rail is effectively and economically taken care of.

It will be apparent that with the arrangement described, a string of loaded trucks 1 can be continuously propelled from the input track section A1, up the incline D, down the semi-circular track section C, where the contents of the trucks are automatically and sequentially dumped into the receiving enclosure T, and then returned in the opposite direction over helical track section D, where the trucks are progressively restored to their upright condition and on to the return track A2. If desired, the two parallel straight track sections A, and A2 may be made to merge, at a branching point of junction, not shown, situated beyond the left end of the structure shown in FIGS. 1 and 2, into a common track; alternatively both track sections A1 and A2 may be made separate over their full length.

The system shown in FIGS. 1 and 2 and just described may also be operated in a manner reverse from that just described, with the loaded trucks entering from the straight track section A2, then being progressively overturned while passing through the helical track section D and being dumped of their contents during this overturning process, then being raised over the part-circular vertical-plane track section C and thence moving down the inclined track section B to issue in upright reversed condition over the track A1 back towards the point from which they first arrived.

In such case, of course, the dumping of the truckloads would not take place over the dumping station T and the dumping and discharge facilities described as provided at that station may be omitted. Instead, the dumping would occur in the straight helical track section D, and the discharge means may then be constructed in the manner shown in FIG. 5. As shown, a receiving conveyor belt 35 is mounted beneath the circular frames 30 about rollers 34 journalled across the legs 33 of the frame supporting structure, and at will be noted that due to the dissymmetrical arrangement of said supporting legs 33 the conveyor belt 35, is offset to one side relative to the vertical center line of the circular frames 30, in the same direction as that in which the contents of the truck bins 9 are dumped owing to the rotation of the trucks as they travel along the helical rails 31A–31D.

FIG. 6 illustrates one convenient form of continuous truck loading means usable in conjunction with the reversing-and-unloading means of the invention. As shown, a hopper 36 is supported from suitable structure (not shown), above and to one side of a straight flat track section of the system, at a desired loading station lying generally leftward of the structure shown in FIGS. 1 and 2. A short length of lateral belt conveyor 37 positioned below the bottom outlet 38 of hopper 36 receives the material therefrom and dumps it on to the upper surface of a longitudinal conveyor belt 39 overlying the path of the trucks 1. The endless conveyor belt 39 is supported on end rollers from suitable supporting structure not shown and is driven in the direction indicated by the arrow, so that its upper stretch advances in the same direction as the movement of the trucks 1 but at a slightly less rapid velocity. In this manner the material dumped as at 40 from the forward end of the longitudinal conveyor belt 39 drops into the bins of trucks 1 with low relative speed, minimizing impacts against the bottom and side walls of the bins and thereby reducing dust and possible damage to the material. Preferably conveyor 39 is of the type including cross members or scraper blades 42, and a deflector sheet 41 is shown underlying the lower leaf of the conveyor to prevent the blades 42 fouling the tops of the trucks. The deflector 41 has a rear end part 41a curving upward around the rear end roller of the conveyor so that any material dropping from the upper conveyor leaf on to deflector sheet 41 is carried back by the scraper blades 42 and returned over the curved portion 41a back to the upper leaf of the conveyor.

As earlier indicated the inclined track section B may be made to a wide range of gradients, but it is quite feasible and in many cases preferable to provide it with a relatively steep gradient, say 30 or 40%, in order to reduce its length. The diameter of the semi-circular track section C, and hence the over-all altitude of the reversing-and-dumping system of the invention, can also be varied over a wide range, and will depend on such factors as the length of the trucks, the truck wheel diameter, and the flexibility of the string of intercoupled trucks in the vertical plane. This vertical flexibility in turn will depend essentially on the maximum degree of relative angular rotation permitted between adjacent trucks 1 by the coupling means 11 used, in the case of rigid trucks. Instead of or in addition to the relative angling permitted by the coupling devices, the trucks or carrier units used may possess some degree of flexibility in the vertical plane, as is known in connection with conveyor systems of the general class to which the invention relates, using elongated trough-like or conduit like carrier units made of flexible sheet material.

In one exemplary construction the invention was applied to standard carrier trucks having a unit length of 1.50 meters and a loading capacity of 150 to 300 kilograms (depending on the loaded material), and the couplings 11 permitted a relative angling of more than 20° in the vertical plane between adjacent trucks. The semi-circular track section C was about 8 meters in diameter, which was the total height of the dumping and reversing system. The incline B was about 27 meters long, with a gradient of 30%.

As regards the helical restoring track section D, the length thereof depends primarily on the torsional flexibility of a string of trucks 1, i.e. on the degree of lateral relative angular rotation permitted between adjacent trucks by the coupling means 11 used, in the case of rigid trucks, or/and any torsional flexibility of the carrier units themselves. In the exemplary system referred to above, the couplings 11 permitted a lateral angle of about 10°. The helical track section was about 30 meters long, and since the total rotation of each truck over this distance was 180°, the rotational angle per unit length was 6° per meter of track. Since the trucks were 1.50 meters long, the relative lateral angling between adjacent trucks was about 9°, which was within the angling capacity of the coupling devices.

It will be noted that the horizontal floor space taken up by the system described is especially small, being included within a rectangular strip 40 meters long by 2 meters wide, only 80 sq. m. in area. The drive stations S were operated to displace the trucks at a linear velocity of 2 meters per second. This is a conservative figure since higher velocities can easily be used. At the indicated drive velocity, in the example referred to, the conveyor system described using continuous strings of trucks each carrying a load of about 210 kilograms, had a total carrying capacity of about 1000 metric tons per hour. At the same time the entire reversing and unloading structure of the invention weighed no more than about ten tons. Since the total length of the three track sections B, C and D was slightly less than 90 meters, the total time required to pass a truck around the structure for completing a reversing and dumping operation did not exceed 45 seconds.

Owing to the comparatively small weight and size of the reversing and unloading system of the invention as evidenced by the above figures, the system can easily be made mobile where desired. This may be especially desirable in cases where the conveyed materials are to be dumped directly at their point of use, as in earth moving operations such as embankments, construction of earth dams, and the like, as well as in mining and metallurgical operations involving the formation of spoil heaps, slag heaps, and similar dumping operations. In such cases the receiving stations shown as including the enclosure T and discharge conveyor would usually be omitted. The forward end of the system of the invention including the vertical semi-circular track section C with its supporting structure may be mounted for displacement on flanged wheels running on rails, or on road wheel provided with pneumatic tires, and may be moved by means of a suitable conventional tractor vehicle of moderate power in accordance with the progress of the work.

It will be observed that the dumping of the truckloads as the trucks move down around the semi-circular track C, as in the first mode of operation described wherein the loaded trucks are delivered from input track A1 and up the incline B, is especially advantageous in that a very thorough discharge of the contents of each truck is accomplished, since each truck remains an appreciable time in fully overturned or inverted condition.

It will be understood that the complete conveyor system according to the invention may include at another end thereof, not shown, a further reversing and overturning structure generally similar to the one including the track sections B, C and D shown and described with reference to FIGS. 1 and 2. The further structure would then serve primarily for reversing purposes not for dumping, and the loading station, e.g. using a loading apparatus of the type described with reference to FIG. 6, would of course be associated with a track section wherein the trucks are in upright position. If desired, such other end structure of the system, including the loading station, may be made mobile in a manner similar to that described above with reference to the unloading end.

A modified embodiment of the invention is illustrated in FIGS. 7 and 8. Here the complete system, as shown in FIG. 8, includes vertical-plane circular-track sections 63 and 64 at both of its ends, after the manner just described, so as to provide a continuous-loop circuit for the trucks. In this case the two-way tracks 65 are shown in vertically spaced relation rather than in the side-by-side horizontally spaced relation shown in FIGS. 1 and 2, and include the upper track 52 for one-way travel (rightward as shown) and the lower track 53 for travel in the opposite (leftward) direction. The superimposed tracks are supported from longitudinally spaced gallows supports 51. The upper track 52 is shown as rising outwards towards each of the terminal reversing structures 63 and 64, and FIG. 7 indicates that these rising track portions are not necessarily sloping at a constant gradient but may if desired include sections of incrementally (or progressively) varying gradient as here shown. In each of the terminal reversing structures 63 and 64, such as that shown in some detail in FIG. 7, there is provided an inner track section 58 which merges at one end with the upper end of the inclined track section 52 and has a downcurving extension 58a. An outer track section 60 merges at its lower end with the end of lower track 53 and includes a part-circular track portion which concentrically surrounds the curved inner track section 58a and is spaced radially outwardly therefrom by an amount corresponding to the diameter of the truck wheels 8. A relatively short backing or guard rail section 61 is associated with the lower part of outer rail section 60 and is similarly spaced above it (or radially inward from it) a distance of one wheel diameter.

The arcuate track sections 58, 60, 61 are supported by an end support gallows 54 which is of reinforced or double construction as shown and includes substantially at its mid-elevation a bearing structure in which a shaft 55 is freely rotatable. Secured on this shaft is a pulley 56 provided around its rim with a thick pneumatic tire 57 inflated to a relatively low air pressure, the arrangement being such that the pulley 56 and tire 57 is concentric with the arcuate track portions such as 60 and 58a.

In this modification, the drive means for the string of trucks 1 is shown as including one (or more) drive wheels such as 66 rotatable on a horizontal axis and driven from suitable power means not shown. Wheel 66 frictionally engage a cooperating surface extending along the under side of each truck 1. Drive wheel 66 is shown in FIG. 8 positioned intermediate the upper and lower tracks 52 and 53 and engageable simultaneously at diametrically opposite portions of said wheels with a truck travelling in upright condition over the upper track and a truck travelling in overturned condition along the lower track. Such dual-acting drive wheel means are per se conventional in rolling conveyor or carrier systems of the general class to which the invention relates.

A loaded upright truck ascending the end incline on upper track 52 (FIG. 7) in the direction indicated by arrow F1 passes on to the track section 58, conveniently an angle iron as here shown, and then to the arcuate extension 58a thereof, thereby gradually tipping forwardly and dumping its load. A receiver conveyor belt 65 is shown positioned to receive the dumped load and discharge it to a suitable point of delivery. The arcuate track portion 58a terminates substantially at, or slightly beyond, the point where the load of the truck wheels 8 is transferred to the outer track section 60. However, substantially ahead of this point, the afore-mentioned under surface of the truck has frictionally engaged the outer periphery of the tire 57 of pulley 56, thereby imparting a rotational torque to the pulley. It will be understood that owing to the resilient deformability of the low-inflation-pressure tire 57, the plurality of trucks 1 which at any given time are simultaneously positioned around the part-circular track section, are all in engagement with contiguous depressed portions of the tire 57 while all having their wheels 8 engaging the outer circumferential track 60. As the trucks sequentially complete their part-circular travel and near the bottom end of the outer track 60, the lower guard track 61, likewise consisting of angles as shown, contributes to re-align them and the trucks then pass in overturned condition to the lower or return track 53.

The use of a pulley 56 provided with a deformable periphery such as a low-pressure tire 57, as shown in FIGS. 7 and 8, is advantageous especially in that it greatly assists in taking up the various radial and lateral reaction forces that tend to be set up between the trucks in the arcuate portions of their path owing to the differences in distance covered by the wheels and the other parts of the trucks, and the angling or misalignment between the adjacent trucks. The pulley by thus taking up the misalignment forces facilitates the transmission of draft force through the couplings between the trucks, and as a result it becomes feasible when using a pulley of the type shown in FIGS. 7 and 8 very greatly to reduce the diameter of the part-circular track sections used according to the invention. By way of indications, whereas in a construction of the type first disclosed herein with reference to FIGS. 1-5, it is found necessary to use part-circular track sections having a diameter not less than about five or six times the length of a truck, in the embodiment of FIGS. 7 and 8 it is practicable to use part-circular track sections having a diameter as low as twice the unit length of a truck, or even somewhat less. A substantial saving in vertical dimensions can thus be realized, so that the resulting system is of especial utility in cases where the vertical clearance is limited, such as in a mine pit or gallery.

On the other hand, it will be realized that the rotation of pulley 56 may absorb an appreciable fraction of draft energy through its inertia as well as the deformation of its low-pressure tire. If relatively high speeds of truck displacement are desired in the conveyor system, means may be provided for imparting rotation to the pulleys 56 at an appropriate velocity from suitable drive means, not shown.

It will be evident also that the truck movement described above is reversible, and that empty trucks in overturned condition may be made to arrive over the lower track 53 in the direction indicated by arrow F′1, ascend the part-circular track structure so as to be brought to upright condition, and then descend the incline and leave by way of the upper track 52 in the direction of arrow F′2. This, in fact, is the mode of operation that normally takes place at the opposite terminal station 63 of the conveyor system shown in FIG. 8. In this case of course, no unloading occurs concurrently with the reversing or overturning process. A loading station which may be generally similar to the one described in connection with FIG. 6 may be positioned at a suitable point of the system, e.g. overlying the upper track 52 at a point near the terminal structure 63.

The comparatively very small vertical height of the circular terminal structures made possible in the embodiment of FIGS. 7 and 8 has the additional advantage of correspondingly reducing the drop sustained by the transported materials as they are dumped from the trucks on to receiving means such as the discharge conveyor 65.

It will be noted that in the embodiment of FIGS. 7 and 8 the upper and lower tracks 52 and 53 are desirably made to connect with the part-circular track section 60 by way of connecting track segments that are inwardly deflected or concave, as seen in the vertical plane, so that the arc around the circumference of tire 57 that is effectively enveloped by the areas of contact engagement with the undersurfaces of the trucks, is somewhat greater than the arc that would be thus enveloped if the said track segments 52 and 53 were connected with the part-circular track section 60 in a strictly tangential relationship. Such an arrangement is found to be advantageous because of increased efficiency in the transfer of torque from the trucks to the pulley, that is, conversion of the draft force imparted to the trucks by the drive wheels such as 66 into rotation of the pulley, through the trucks that have just advanced over the track section 58 to engage the tire 57 and/or the trucks that have just disengaged the tire and are advancing on to the lower track section 53.

It will be understood that many and varied modifications may be made in the exemplary embodiments of the invention herein disclosed without exceeding the scope hereof. Thus, features disclosed in the respective embodiments may be transferred from one to the other embodiment in various combinations. The detailed construction of the component parts of the systems may depart in various ways from what is here schematically shown and in accordance with conventional structural engineering practice.

While the invention has been described in the case of strings of wheeled trucks, it is to be understood that the rolling conveyor or carrier means to which the invention is applicable may assume other forms. Thus, the invention is applicable to carrier means in the form of elongated open-topped conduits or troughs of flexible sheet material, mounted on longitudinally spaced pairs of wheels. It is to be understood therefore that expressions such as "longitudinally-flexible, open-topped carrier means provided with longitudinally-spaced wheels," or "longitudinally-flexible string of open-topped, wheeled carrier means," and similar expressions, are to be interpreted as each referring broadly to either type of rolling conveyor or carrier apparatus as just defined.

What I claim is:

1. In a conveyor system for bulk material, in combination:
   a continuous conveyor track having an upper forward-track portion and a lower return-track portion lying in a common vertical plane at least along part of said track;
   a chain of open-top conveyor cars riding on said track, said cars each being provided with a respective swivel coupling at the other end of each car, tying the adjacent cars together with freedom of relative angular movement between adjacent cars;
   a return station along said track including an arcuate track section lying in the vertical plane of said track portions and interconnecting same for diverting said chain of cars from said upper track portion to said lower track portion about said track section while discharging the open-top cars of the bulk material carried therein upon the passage of said cars about said section;
   drive means for advancing said chain of cars through said section; and
   a rotatable pulley centered on the radius of curvature of said track section and lying in said vertical plane, said pulley having a resiliently deformable periphery engageable with said cars for yieldably retaining same during movement of said cars about said section.

2. The combination defined in claim 1 wherein said pulley is provided with a pneumatic tire inflated at low pressure and forming said resiliently deformable periphery.

3. In a conveyor system for bulk material, in combination:
   a continuous conveyor track having an upper forward-track portion and a lower-track portion lying in a common vertical plane at least along part of said track;
   a chain of open-top conveyor cars riding on said track, each of said cars being generally elongated in the direction of movement of the car and being supported on said track with only a single axle proximal to one end of each car and with respective wheel means mounted on the respective axle and rollingly engaging said track, said cars each being provided with a respective swivel coupling at the other end of each car, tying the adjacent cars together with freedom of relative angular movement between adjacent cars;

a return station along said track including an arcuate track section lying in the vertical plane of said track portions and interconnecting same for diverting said chain of cars from said upper track portion to said lower track portion about said track section while discharging the open-top cars of the bulk material carried therein upon the passage of said cars about said section;

a transport conveyor underlying at least part of said section for receiving the material discharged from said cars and carrying it away from said track; and drive means for advancing said chain of cars through said section.

4. The combination defined in claim 3 wherein said track section is formed with;

an inner track member merging with said upper track portion and extending arcuately about said section at least along an upper part thereof, and an outer track member concentric with said inner track member and merging with said lower track portion while extending arcuately along at least a lower portion of said section for receiving the weight of said cars, said track members being radially spaced by a distance equal substantially to the diameter of said wheel means.

5. The combination defined in claim 4 wherein said outer track member and said lower track portion are of circular cross-section, said wheel means of each car including a respective wheel rollingly engaging said members and an inner annular flange bearing along inside surfaces of said members, said inner member having a flange upon which the wheel flanges rest in the region of said outer member.

6. The combination defined in claim 3, further comprising a loading station remote from said section and provided with:

an endless-belt conveyor overlying said chain of cars and in the plane thereof, supply means for depositing the above material onto an upper reach of said endless-belt conveyor, and means for driving said upper reach of said endless-belt conveyor in the direction of displacement of said cars.

7. The combination defined in claim 6 wherein said endless-belt conveyor has transverse scraper members spaced along its length, and a deflector plate underlying the lower reach of said belt conveyor and swept by said scraper members upon their return along said plate, said plate having an arcuate deflector portion partly surrounding a rear end of said endless-belt conveyor for returning material overflowing onto said deflector plate back to the upper reach of said endless-belt conveyor.

8. The combination defined in claim 3 wherein said drive means includes:

a pair of skirts extending longitudinally alongside each of said cars and fixed thereto, a powered drive roller rotatable about a vertical axis and frictionally engaging the skirts along one side of said chain of cars, and a counterroller bearing upon such skirts along the opposite side of said chain of cars for advancing same.

9. The combination defined in claim 3, further comprising means along said track including a helical track section extending about a horizontal axis for uprighting said cars upon their passage from said section.

10. The combination defined in claim 9 wherein said lower track portion is twisted about said horizontal axis through half a convolution of a helix to form said helical track section.

11. The combination defined in claim 10 wherein said helical track section is constituted by four helically twisted round rails disposed in two laterally spaced pairs, the rails of each pair engaging diametrically opposite areas of the wheel means of the related side of said cars.

References Cited
UNITED STATES PATENTS

| | | | |
|---|---|---|---|
| 1,021,052 | 3/1912 | Lawson | 198—141 |
| 1,449,208 | 3/1923 | Wood | 198—174 |
| 2,121,365 | 6/1938 | Pardee | 198—147 X |
| 2,243,538 | 5/1941 | Salfisberg | 198—203 |
| 2,936,875 | 5/1960 | Von Kritter et al. | 198—147 |

EVON C. BLUNK, *Primary Examiner.*

A. C. HODGSON, *Assistant Examiner.*